US006208437B1

(12) United States Patent
Neushul

(10) Patent No.: US 6,208,437 B1
(45) Date of Patent: Mar. 27, 2001

(54) VIEWING LIGHT BOX SCANNER FOR SCANNING AND VIEWING TRANSMISSIVE AND REFLECTIVE MEDIA IMAGES

(76) Inventor: Stephen Neushul, 131 A Paseo de la Concha, Redondo Beach, CA (US) 90277

( * ) Notice: Subject to any disclaimer, the term of this patent is extended or adjusted under 35 U.S.C. 154(b) by 0 days.

(21) Appl. No.: 08/089,311

(22) Filed: Jul. 12, 1993

(51) Int. Cl.$^7$ ................................ H04N 1/04; H04N 1/10
(52) U.S. Cl. ....................... 358/487; 358/497; 358/475
(58) Field of Search ................................ 358/487, 473, 358/474, 497, 6, 506, 527, 475; 382/59; 378/128, 178; 40/361, 363; 128/653.1, 653.2, 653.5, 903, 904; 348/96

(56) References Cited

U.S. PATENT DOCUMENTS

| 4,628,356 | * | 12/1986 | Spillman et al. | 358/111 |
| 4,879,604 | * | 11/1989 | Koshiyouji | 358/474 |
| 4,908,876 | * | 3/1990 | DeForest | 382/54 |
| 4,996,785 | * | 3/1991 | Cicenas | 40/361 |
| 5,068,909 | * | 11/1991 | Rutherford et al. | 382/49 |
| 5,241,406 | * | 8/1993 | Johnston et al. | 358/487 |
| 5,245,539 | * | 9/1993 | Romeas et al. | 364/413.13 |
| 5,321,520 | * | 6/1994 | Inga | 358/403 |
| 5,384,862 | * | 1/1995 | Echerer et al. | 382/6 |

FOREIGN PATENT DOCUMENTS 0 162 528   11/1985 (EP) .

OTHER PUBLICATIONS

A. Allam, Letter to the Editor: Low Cost Autonomous System of Image Acquistion and Processing Using a Linear CCd Camera, L'Onde Electrique, vol. 72, No. 2, Mar./Apr. 1992, pp. 54–56.
A. Allam, Lettre a l'editeur: Systeme d'acquistion et de traitement d'image autonome a faible cout par camera lineaire CCD, L'Onde Electrique, vol. 72, No. 2, Mar./Apr. 1992, pp. 54–56.
Patent Abstracts of Japan, vol. 014, No. 161 (E0909), Mar. 28, 1990 & JP–A–02 016863 (Minolta Camera Co. Ltd.), Jan. 19, 1990 Abstract.

* cited by examiner

Primary Examiner—Scott Rogers
(74) Attorney, Agent, or Firm—Blakeley Sokoloff Taylor & Zafman

(57) ABSTRACT

A wall mounted scanner for large and small format transmissive X-ray films and any type of transmissive media, that incorporates a viewing light box into the case to view the media before and after scanning. Transmissive media are defined as any type of media that passes light through it, specifically images on transparent film. Scanning light source can also be moved so that the unit can scan reflective media.

The scanner has an external light source that shines through the media onto a lens/CCD camera. The media is transported under the light source for scanning and then it is brought back to the viewer for immediate comparison to the scanned image which is displayed on the computer monitor. The entire scanner is mounted vertically. Scanning and viewing is done in the vertical plane to allow for minimal contact between the media and scanner. It is possible to pivot the light source below the media to be scanned in order to scan reflective media.

17 Claims, 3 Drawing Sheets

VIEWING LIGHT BOX SCANNER FOR SCANNING AND VIEWING TRANSMISSIVE AND REFLECTIVE MEDIA IMAGES

BACKGROUND OF THE INVENTION

The present invention is an application of the technique of digitizing photographic media using a Charge Coupled Device (CCD) and a light source. With the increased need to digitize X-ray film images and similar transparent media, for storage, transport, and ease of manipulation, there has been a corresponding demand for a scanner that can effectively handle and scan such media using a low cost CCD device. The added feature of being able to pivot the light source below the media to scan reflective images is also very useful for general scanning utility.

Laser based drum scanners exist that can scan large and small format X-ray films, also CCD based flat bed and roller feed scanners exist that are capable of scanning transmissive media, however they do not allow for scanning and immediate vising of the media from a wall mounted light box/ scanner combination. None of these scanners is mounted such that the media is viewed and scanned in the vertical plane.

SUMMARY OF THE INVENTION

It is the primary object of the present invention to provide an X-ray scanner capable of scanning X-ray films and similar media, and to facilitate the film handling and image analysis procedures by allowing immediate comparison between scanned and actual film images. It is also important to include the possibility of scanning reflective media by allowing for the scanning light to be relocated.

It is another objective of the present invention to provide a machine that will scan transmissive/reflective film images and the like, while minimizing contact between the machine and the film to be scanned.

A third objective is to provide a scanner that is minimally intrusive. That is, a scanner that takes up little or no desk or floor space.

The above and other objectives and features of the present invention will become apparent from the following detailed description and accompanying drawings.

BRIEF DESCRIPTION OF DRAWINGS

FIGS. 1 and 2 are sectional views showing a principal construction of the present scanner incorporating the features of the invention, of which FIG. 1 shows a view of the method of scanning an image and FIG. 2 shows the layout of the scanner and light box.

Figure 1:
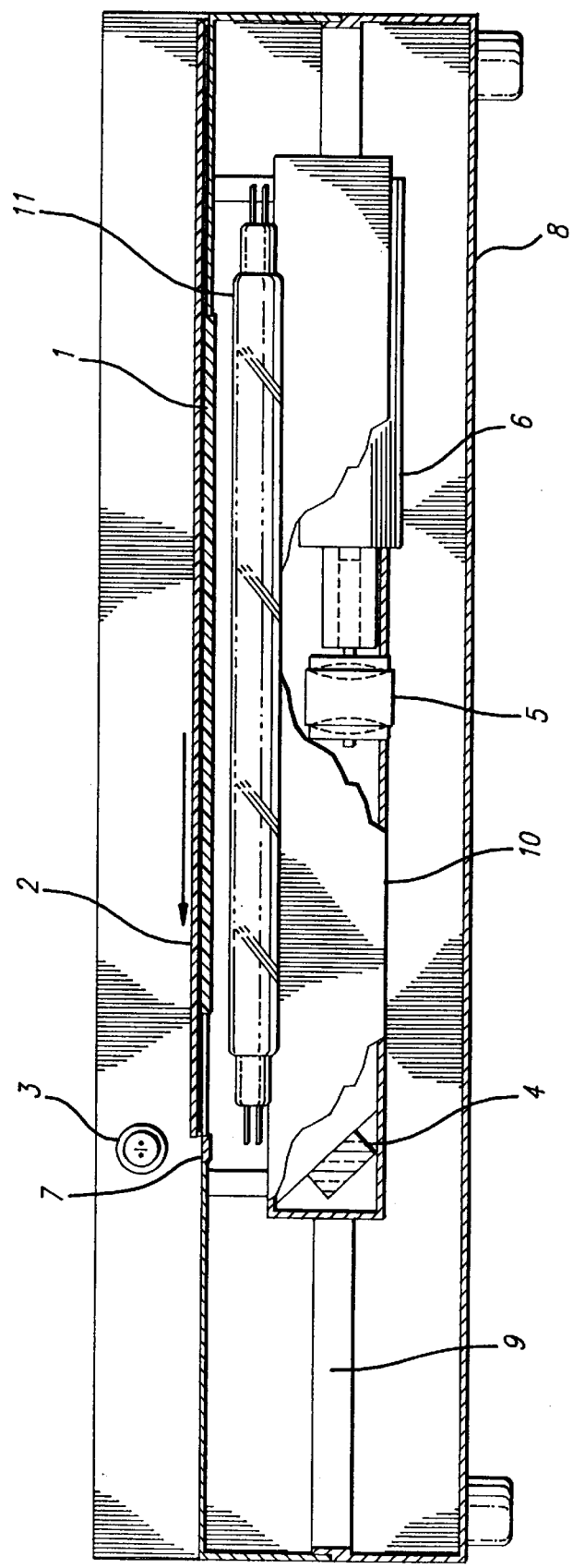

DETAILED DESCRIPTION OF THE PREFERRED EMBODIMENTS:

An embodiment of the present invention will be described hereunder. [principal Construction of X-ray scanner and viewing device] Referring to FIG. 1, there is illustrated in sectional view a principal construction of the X-ray scanner embodying the present invention. Numeral 1 denotes a translucent Plexiglas cover of the viewing light box. Numeral 2 denotes the transport mechanism that consists of a flat drawer type ball bearing slide attached to the transport mechanism which is made of a gear rack and a pinch type clip for hanging films. Numeral 3 denotes an end view of a fluorescent light source and mounting tube. This light source can also be located under the media plane so that reflective media can also be scanned. Transport mechanism 2 transports film over light table surface 1 and under light source 3.

Numeral 4 denotes an end view of a front surface mirror. Numeral 5 denotes a lens assembly and numeral 6 denotes an end view of a CCD camera. Light from light source 3 shines through film mounted on transport 2, bounces off mirror 4 and is focused by lens 5 on CCD camera 6. Alternately, if light source were placed within the case, light would bounce off reflective media, onto mirror 4 and focused as before.

Numeral 7 denotes an end view of a plate of glass. Numeral 8 denotes a case of metal or plastic. Numeral 9 denotes a dotted line that indicates where case 8 splits open to allow for assembly and maintenance. Glass 7 seals case 8 from external dust and particulates. There is no other way for dust to enter-the case enclosure and thus optics and electronics are sealed.

Numeral 10 denotes a side view of one of the two support U channels. Numeral 11 denotes a side view of fluorescent tubes that illuminate light box cover 1.

Support channels serve as mounting surfaces for mirror 4, lens 5, CCD camera 6, fluorescent bulbs 11, and for mounting assembly to case.

Figure 2:
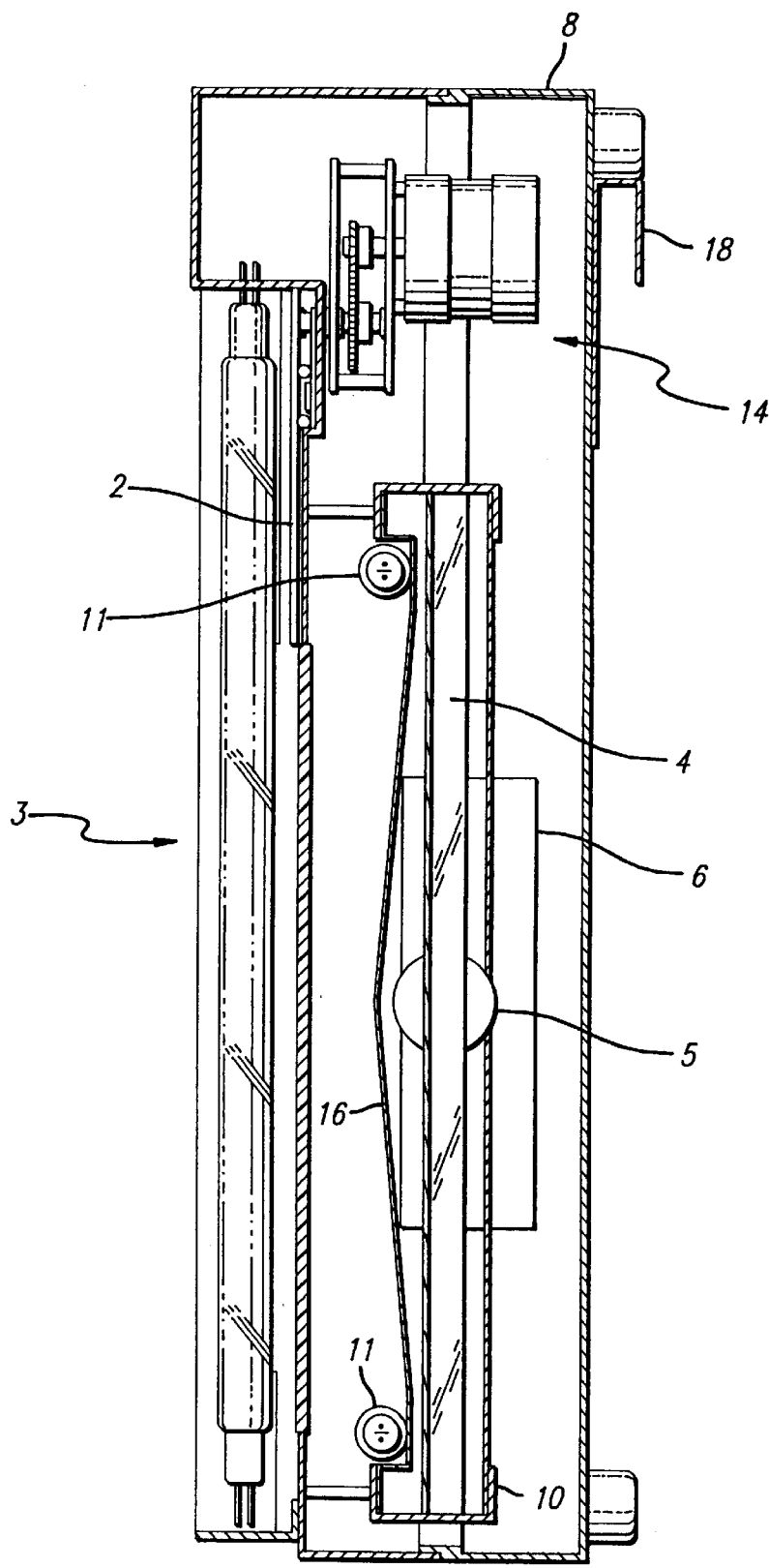

Referring to FIG. 2, Numeral 3 denotes a side view of external light source and mounting tube. Numeral 2 denotes an end view of the transport mechanism, pinch clip and rack gear. Numeral 14 denotes the drive stepper motor and gear assembly. Film media is clamped into pinch clip 2 and transport mechanism/rack gear 2 mesh with stepper motor/ gear assembly 14 to drive film under light source 3.

Numeral 11 is an end view of the two fluorescent lights used to illuminate the translucent Plexiglas light box cover 1. Numeral 16 denotes an end view of a bent metal or plastic form that is reflective on the side facing the Plexiglas cover. Reflective metal piece 16, diffuses light from fluorescent tubes 11 while also acting as a mounting surface for these tubes and adding to the structural integrity imparted to the structure by U channels 10 coupled to reflective metal piece 16. The unit mounting bracket is denoted by number 18. This mounting bracket 18 mounts scanner vertically on a wall or fixture by hooking over another wall/fixture mounted bracket.

Figure 3:
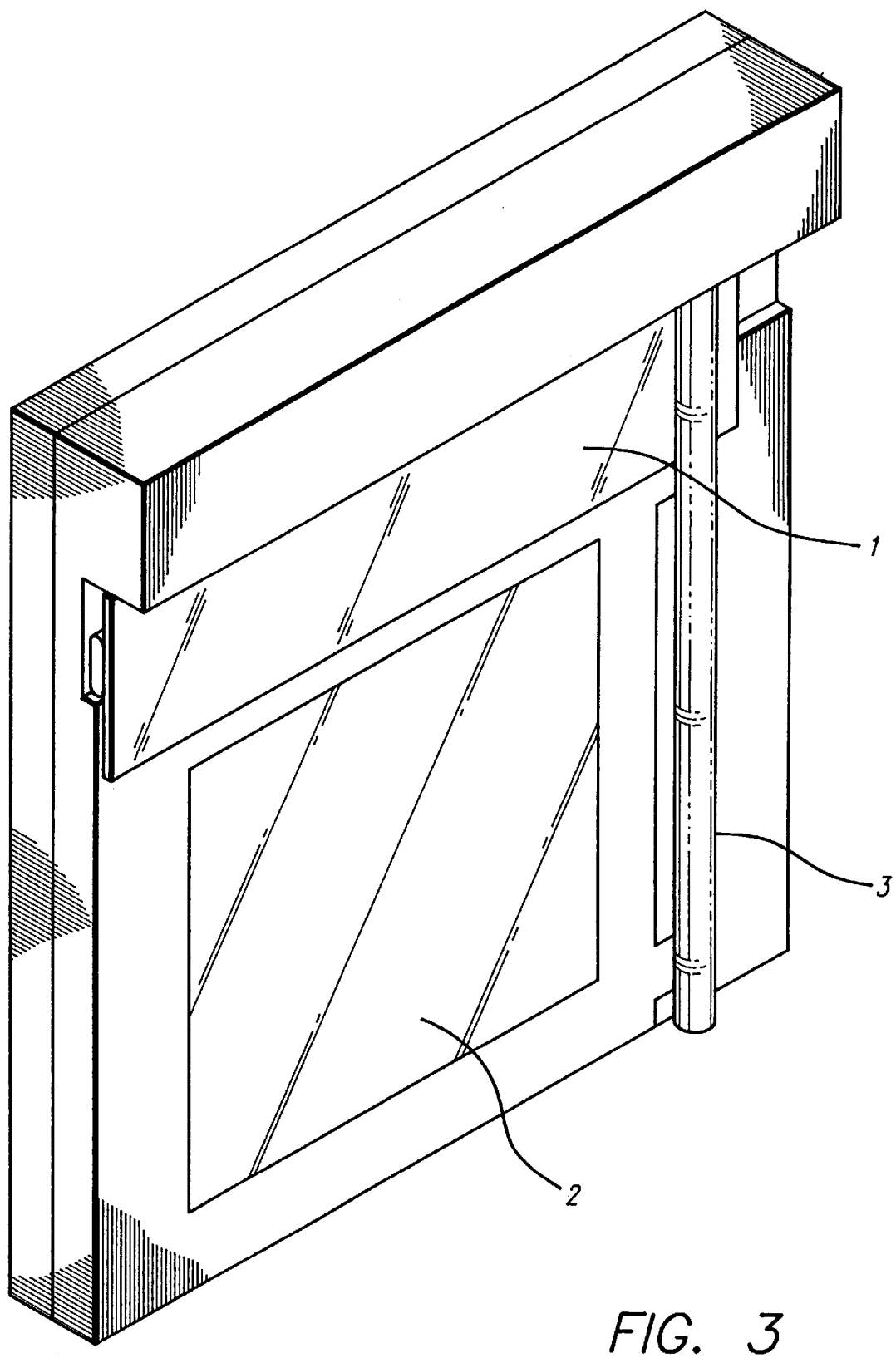
FIG. 3 is an explanatory view of the scanner showing the viewing light box and scanner configuration, as well as the external fluorescent light source and transport mechanism.

FIG. 3 shows the light box 1, the scanning transport assembly 2, and the light bar 3. Again, the unit functions by attaching transmissive film to transport 2, viewing it through light box 1 and then scanning it by passing it under light bar 3.

(Operation)

Referring to the parts represented in all of the figures:

The operation of the X-ray/transmissive media scanner of the present invention will now be described. The scanner is attached to a computer and monitor capable of handling image data. The light box is activated by providing power to the florescent bulbs 11. Light shines through the light box 1. Transmissive film media is mounted by pushing an edge of the film into pinch clamp 2 and is illuminated by light shining through cover 1. The film can then be analyzed to determine the quality of the image and area of interest. Power is then supplied to the scanner CCD camera electronics and light source 3. At a command from the attached computer, the media is transported by slide assembly 2 past fluorescent light source 3, and scanned into a computer file using mirror 4, lens 5, and CCD camera 6. If the image to be scanned is reflective, the scanning light source would be placed within the case and scanning would proceed as before. The media is then returned to it's original position. The final scanned image is displayed on a computer monitor. The comparison is now made between the actual media and it's scanned image without touching the media. If the image is not satisfactory, it is then possible to adjust the output of the light source 3 to produce a different level of light to change the scan characteristics.

Having described my invention as related to the embodiment shown in the accompanying drawings, it is my intention that the invention not be limited by any details of the description, unless otherwise specified, but rather be construed broadly within its spirit and scope as set out in the accompanying claims.

What is claimed is:

1. A light box scanner to scan a media image stored on a media and to allow viewing the media image, said light box scanner comprising:

a scanner to scan the media image; and an x-ray viewing light box coupled to the scanner, and arranged so that said scanner is disposed within a housing of said light box, said light box and said scanner forming a single, integral unit which allows viewing of the media image without touching or removing the media.

2. The light box scanner of claim 1 wherein said light box is disposed in a generally vertical plane.

3. The light box scanner of claim 1 having a horizontal dimension and vertical dimension wherein the horizontal dimension is substantially less than the vertical dimension.

4. The light box scanner of claim 1 said scanner comprising a light source said light source being a vertically mounted fluorescent tube.

5. The light box scanner of claim 1 further comprising an attachment device for attaching the media to said light box scanner, whereby only edge contact exists between the media and said light box scanner.

6. The light box scanner of claim 5 wherein the attachment device is a movable bar clip.

7. A light box scanner to scan a media image stored on a media and to allow viewing of the media image, said light box scanner comprising:

a scanner to scan the media image; and an x-ray viewing light box coupled to the scanner, and arranged so that said scanner is disposed within a housing of said light box, said light box and said scanner forming a single, integral unit which allows viewing of the media image, said unit being vertically mounted, whereby scanning is done in a vertical plane.

8. The light box scanner of claim 7, having a horizontal dimension and a vertical dimension wherein the horizontal dimension is substantially less than the vertical dimension.

9. The light box scanner of claim 7 said scanner comprising a light source said light source being a vertically mounted fluorescent tube.

10. The light box scanner of claim 7 further comprising an attachment device for attaching the media to said light box scanner, whereby only edge contact exists between the media and said light box scanner.

11. The light box scanner of claim 7 further comprising a stationary camera and a transport mechanism where said transport mechanism moves the media past said camera during scanning.

12. A light box scanner to scan a media image stored on an x-ray film and to allow viewing of an x-ray image said light box scanner comprising:

a scanner comprising a stationary CM camera to scan the image;

an x-ray viewing light box coupled to the scanner, and arranged so that said scanner is disposed within a housing of said light box, said light box and said scanner forming a single, integral unit which allows viewing of the x-ray film and scanned image without touching or removing the x-ray film.

13. The light box scanner of claim 12 further comprising an attachment device for attaching the media to said light box scanner wherein only edge contact exists between the x-ray film and said light box scanner.

14. The light box scanner of claim 12 said scanner comprising a light source said light source being a vertically mounted fluorescent tube.

15. The light box scanner of claim 12 wherein said unit is vertically mounted.

16. The light box scanner of claim 12 wherein said light box is disposed in a generally vertical plane.

17. The light box scanner of claim 12 further comprising a transport mechanism for moving the media before said stationary camera.

* * * * *

UNITED STATES PATENT AND TRADEMARK OFFICE
CERTIFICATE OF CORRECTION

PATENT NO.   : 6,208,437 B1
DATED        : March 27, 2001
INVENTOR(S)  : Neushul It is certified that error appears in the above-identified patent and that said Letters Patent is hereby corrected as shown below:

Title page,
Item [56], OTHER PUBLICATIONS, line 3, delete "CCd Camera" and insert -- CCD Camera --.
Item [56], OTHER PUBLICATIONS, line 5, delete "Systeme d'acquistion" and insert -- Systeme d'acquisition --.
Item [74], *Attorney, Agent, or Frim* name, delete "Blakeley Sokoloff Taylor & Zafman" and insert -- Blakley Sokoloff Taylor & Zafman --.

Column 4,
Line 25, delete "stationary CM camera to scan the" and insert -- stationary CCD camera to scan the x-ray --.

Signed and Sealed this

Twenty-second Day of January, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO. : 6,208,437 B1
DATED : March 27, 2001
INVENTOR(S) : Neushul

Page 1 of 1

It is certified that error appears in the above-identified patent and that said Letters Patent is hereby corrected as shown below:

Title page,
Item [56], OTHER PUBLICATIONS,
Line 3, delete "CCd Camera" and insert -- CCD Camera --.
Line 5, delete "Systeme d'aquistion" and insert -- Systeme d'acquisition --.
Item [74], *Attorney, Agent or Firm*, delete "Blakeley Sokoloff Taylor & Zafman" and insert -- Blakely Sokoloff Taylor & Zafman --.

Column 4,
Line 25, delete "stationary CM camera to scan the" and insert -- stationary CCD camera to scan the x-ray --

This certificate supersedes Certificate of Correction issued January 22, 2002.

Signed and Sealed this

Ninth Day of April, 2002

Attest:

Attesting Officer

JAMES E. ROGAN
*Director of the United States Patent and Trademark Office*